3,127,318
SWINE TREATMENT
Russell A. Eversole, Excelsior, and Francis C. Wingert, Anoka, Minn., assignors to Cargill, Incorporated, Wilmington, Del., a corporation of Delaware
No Drawing. Filed Mar. 19, 1962, Ser. No. 180,819
8 Claims. (Cl. 167—78)

The present invention generally relates to swine treatment and, more particularly, relates to a method of conferring immunity on baby pigs against swine diseases.

Considerable losses of baby pigs occur due to attacks by various types of diseases caused by a wide range of endogenous and non-endogenous agents, principally micro-organisms, including bacteria, viruses, molds, yeasts, actinomycetes, as well as disease-causing agents not yet identified.

For the purposes of the present invention, by the term antigenic disease-causing agent is meant a disease-causing agent, usually a micro-organism, for which there exist antigens capable of stimulating the development of antibodies in swine in contact with such disease-causing agent or antigen.

The newborn pig does not possess very much immunity against disease-causing agents, but its immunity against certain endogenous disease-causing agents greatly increases after nursing begins. Immunity to diseases is, at least in part, the result of the development or transmission to the particular animal of specific antibodies which attack and/or ward off disease-causing agents. Exposure of an animal to antigens generally results in the development of corresponding antibodies in the animal's system. Antibodies may be defined as certain proteins found principally in the blood serum and colostral milk, and characterized by specific reactivity with the corresponding antigen. Antigens may be similarly defined as substances which initiate and mediate the formation of antibodies. Antigens may be proteins or polysaccharides derived from portions of the disease-causing or similar micro-organism, e.g., from the cell walls, cell interior, flagella, etc. of bacteria, protozoa, etc., or may be excreted by the micro-organism or released upon death of the micro-organism, etc. In a broader sense, antigens also include the micro-organisms themselves in the active or in the inactive form, i.e., attenuated or killed. The presence of specific antibodies in the blood of an animal is presumptive evidence of past or present contact with specific antigenic disease-causing agents, such as antigenic micro-organisms.

The low immunity level (low antibody titre) in newborn pigs is evidence of little transmission of antibodies from the mother sows to their offspring through the placentae before farrowing. However, inasmuch as the general antibody titre of the baby pig (offspring) rapidly increases as nursing begins, it is probable that antibodies are transmitted by the sow in substantial quantities in the first milk, i.e., colostrum. It is known that the general antibody titre does rise rapidly in nursing pigs in the period between their first nursing and up to about seven days after birth. Immunity is therefor conferred by the sow to its nursing offspring, but such immunity is only of a limited nature. Thus, it only extends to most but not all diseases which are endogenous to the sow, i.e., diseases which the sow has previously been exposed to, diseases which normally form part of the sow's environment. In some instances, endogenous disease do not result in the production in the sow of appreciable antibody titres and, accordingly, the sow's colostrum does not contain in such instances appreciable antibody titres against such diseases. Such diseases might be said to be non-antigenic.

Microbes, causitive agents of diseases, are antigenic. Those which are not endogenous to the sow, i.e., which the sow has not previously encountered, do not, of course, result in antibody titres in the sow, and, accordingly, no immunity whatever is conferred to the sow's offspring against such micro-organisms. It is those non-endogenous antigenic swine disease-causing micro-organisms which are responsible for a considerable mortality in baby pigs and which are also responsible for serious swine epidemics. Moreover, such offspring do not establish their own antibody titres against such non-endogenous micro-organisms.

Although the antibody titres against specific endogenous micro-organisms do reach relatively high immunity-conferring levels in nursing pigs within a week or so after birth, such antibody titres drop continuously thereafter so that usually by between the third and seventh week after birth, depending on the particular antibodies involved, the nursing baby pigs have less than immunity-conferring antibody titres even against those endogenous diseases against which they were previously protected. At this point, what is known as an immunity-gap with respect to antigenic endogenous diseases begins. This gap continues until the pigs are considerably older, i.e., usually until they are about 20 weeks of age, at which time they begin to acquire the ability to synthesize their own antibodies when exposed in the usual manner to endogenous diseases.

It has been found that pigs up to about 20 weeks of age apparently are only capable of synthesizing their own antibodies if they are directly injected with antigen. This is the case, even though pigs normally "bathe" in high concentrations of endogenous antigenic disease-causing micro-organisms, such as, for example, are usually found in the feces, food, and ground of pig styes. The term "bathe" refers to the wallowing around and rooting of swine in their pens.

Accordingly, the danger period wherein there is appreciable likelihood of contraction of disease with regard to non-endogenous diseases and so-called non-antigenic endogenous disease, comprises a total immunity gap extending onward from the birth of the pigs, and usually is more serious the younger the pig is. In contrast, the danger period with regard to antigenic endogenous diseases comprises an immunity gap usually beginning at from about 3 to about 7 weeks of age and extending until the pig is about 15 to 20 weeks of age.

The direct injection of each newborn pig with a wide range of prepared antigens in order to reduce or eliminate the described immunity gaps is relatively impractical from an economic standpoint. Moreover, considerable danger may be involved in carrying out subcutaneous or similar direct injections of antigens on young pigs. Thus, doses of antigens sufficiently large to stimulate the relatively rapid development of high antibody titres against antigenic micro-organisms can produce serious side effects, notably anaphylactic shock, which in turn can result in physical debilitation and even death of the injected pigs. Although it is possible to at least partially counteract or prevent anaphylactic shock by the simultaneous injection of antihistamines, it will be appreciated that this procedure would considerably increase the ultimate cost of conferring immunity on the young pigs.

Heretofore, as far as is known, no practical economical method has been found to reduce or eliminate the described immunity gaps in swine.

There has now been discovered a method whereby immunity against antigenic disease-causing agents can be readily and practically conferred on nursing pigs to reduce or eliminate the described immunity gaps. Such method is relatively simple, low cost and effective, resulting in substantial reductions in mortality and debilitations of nursing pigs due to diseases caused by such antigenic agents.

Accordingly, the principal object of the present invention is to provide simple effective means whereby immunity against antigenic disease-causing agents can be conveniently conferred on nursing pigs. It is also an object of the present invention to provide a simple and effective method of reducing or eliminating the usual immunity gaps in nursing pigs against specific antigenic disease-causing agents. It is a further object of the present invention to provide a relatively low cost method of increasing specific antibody titres in nursing pigs against specific endogenous and/or non-endogenous antigenic disease-causing agents. Further objects and advantages of the present invention will be apparent from a study of the following detailed description.

The present invention generally comprises a method whereby immunity against selected antigenic disease-causing agents can be readily conferred on nursing pigs. In this regard, the method involves establishing in the pregnant or mother sow during a critical period of time high specific antibody titres, such titres thereafter being transferred by the sow to its nursing offspring. In carrying out the present method, selected areas of the sow's mammary tissues are directly injected with selected antigens, as by subcutaneous or intramuscular injection.

Now referring more particularly to the steps of the method of the present invention, a pregnant sow or one which has already farrowed is injected with antigen. It has been found that in order to produce the desired results, it is necessary to inject thhe sow with antigen during the time commencing not more than about four days before farrowing, and terminating not more than about 24 hours after completion of farrowing. If a pregnant sow is directly injected, e.g., subcutaneously, with antibody titre-increasing amounts of antigen previous to about 4 days before farrowing, there is a real and substantial danger that the antigen injection will cause the sow to abort its litter. Typical of the reactions encountered are the following:

In a series of tests run on pregnant sows, two of the sows were subcutaneously injected, two weeks before farrowing, with solutions of killed *Salmonella typhimurium*, a micro-organism responsible for certain swine intestinal infections. The micro-organisms had been killed with 3 percent (3%) phenol solution and were in a concentration of about $10^{12}$ cells per dose. Each dose also included sterile water, 400,000 units of penicillin and 1 g. of streptomycin. Each sow received 2 subcutaneous injections directly into the mammary tissue adjacent the teats. Both pregnant sows so injected aborted within about 48 hours after the injections. Two other pregnant sows injected in an identical manner with the same solutions, but immediately after farrowing, showed no adverse effects from the injections.

No adverse effects, including aborting, have been observed in pregnant sows injected with antigen within about 4 days before farrowing. Moreover, it is preferred that the antigen injections be given during a period commencing with completion of farrowing in order to eliminate any remote possibility of causing the sow to abort.

It will be understood that the antibody stimulating injections could be given at any time after the indicated commencement date without adverse effects to the sow. However, for practical purposes, the effective period for the injections terminates about 24 hours after completion of farrowing. In this regard, if the antigen injections are given later than about 24 hours after farrowing, there is no assurance that effective immunity against the antigenic disease-causing agent to be protected against will be conferred on the sow's offspring in time to eliminate their immunity gap.

After the injection is made into the sow, there is a brief period of time before the desired increase in the blood and colostral antibody titres occurs. The antibodies in the colostrum are then transferred to the sow's offspring during nursing. They are absorbed from the colostrum or subsequent milk through the baby pigs' gastro-intestinal walls and into the blood stream thereof to confer immunity.

It has been found that if the indicated injection is not made by at least about 24 hours after completion of farrowing, by the time the nursing pigs have consumed the colostral antibodies, in many cases the gastro-intestinal walls of the baby pigs are no longer able to pass sufficient quantities of biologically active antibodies therethrough to establish an immunity-conferring blood antibody titre in the baby pigs.

Since it is desirable to eliminate the immunity gap as soon as possible after birth of the pigs, it is preferred to carry out the indicated injections of antigen into the sow almost immediately after farrowing. The younger the nursing pig is, the more naturally susceptible it is to attacks of disease-causing agents.

Regarding the best mode of administration of antigens to the sow, a series of tests were run. Thus, ten sows were exposed to bacterial suspensions of *Serratia marcescens*. Blood samples were collected from both the sows and offspring and milk samples were similarly collected from the sow on farrowing day, on the third and seventh days thereafter and 3–4 weeks after farrowing.

The udders of two of the pregnant sows were massaged twice weekly starting about two weeks before farrowing and up to farrowing time, with ointment comprising 3 ml. of *Serratia marcescens* concentrate plus 75 g. of Vaseline.

The *Serratia marcescens* antigen was prepared as follows: 18 Roux bottles containing 3.125 g. veal infusion broth powder, 2.5 g. agar and 125 ml. deionized water were sterilized. Two flasks containing 250 ml. each of veal infusion broth were also sterilized, cooled, inoculated with *Serratia marcescens* and incubated at room temperature for two days. Ten (10) ml. of the incubated broth was then disposed in each of the Roux bottles, and allowed to grow at room temperature for 48 hours, after which the cells were killed in the Roux bottles with 10 ml of 3 percent phenol. Cells were harvested by scraping the agar with a rubber squeegee, after which the cells were washed three times with normal saline and diluted to a concentration of $2.25 \times 10^{11}$ cells/ml.

The udders of two of the sows were massaged daily for six days after farrowing with the described ointment.

Two of the sows had the described concentration of *Serratia marcescens* sprayed into their nose twice weekly for two weeks until farrowing.

Two of the sows were orally given gelatin capsules containing the bacterial concentrate twice weekly for two weeks until farrowing.

One sow was given the bacterial concentrate rectally twice weekly for two weeks until farrowing.

One sow was injected with the bacterial concentrate intramuscularly twice weekly for two weeks before farrowing.

The response of the sows and offspring to the described antigenic treatment was measured by means of the standard "tube agglutination test" in which the blood or milk serum in different dilutions is checked for agglutination with the antigen after a suitable incubation period. The "tube agglutination test" is described in Kolmer, J. A. (1944), Clinical Diagnosis by Laboratory Examinations, N.U. Appleton, 1st Rev. Ed., pp. 1103–4.

The results of the tests clearly indicated that blood and milk titres of the sows were generally very low despite the high concentration of antigen administered. (As used herein, titre is the antibody strength of the milk or blood serum, expressed as the reciprocal of the highest dilution of the serum which gives a positive reaction.) The route by which the antigen was administered made little difference in the results, the intramuscularly injected sow being the only one which showed even a moderate response. A 100 response was the highest noted in any of the sows. The nursing pigs were almost uniformly negative with respect to antibody titres in their blood immediately before and throughout the observed nursing period. Accordingly, the indicated routes for administration of the antigen are clearly inadequate to uniformly confer immunity on the nursing pigs.

A second series of experiments were conducted utilizing intramammary injections, that is, subcutaneous or intramuscular injections directly into the mammary tissues of the udder outside of the teats in pregnant sows, and in sows which had just completed farrowing. Due to the morphology of swine teats, it is not possible to directly perfuse the antigen into the udder through the teat canals in immunity-conferring amounts. However, subcutaneous or intramuscular injection, as described, does achieve these objects. In carrying out the test utilizing the intramammary injections, *Serratia marcescens* in the previous indicated concentration was used and also killed *Salmonella typhimurium*. The latter was given in a dosage containing about $10^{12}$ cells and was prepared by a procedure similar to that described for the *Serratia mercescens*. In each instance, blood samples were collected from the sow and baby pigs and milk was collected from the sow at birth of the baby pigs before nursing, at 24 hours after birth and at one week after birth. In none of such tests did the sow's milk or the baby pigs' blood contain any measurable titre at birth before nursing.

Two of the pregnant sows were injected with one dose, in each of two regions of the udder, of the killed *Salmonella typhimurium* about two weeks before farrowing, with the result that both sows aborted 48 hours after the injections. Milk and blood samples collected from the sows after the abortion indicated significant anibody titres.

Control sows which had not been injected with the antigen showed no antibody titres of *Salmonella typhimurium* in the blood and milk at various times before and after farrowing.

One sow was injected a few hours after farrowing with two doses each containing $1 \times 10^{11}$ cells of killed *Salmonella typhimurium*. The milk samples taken 24 hours after injection showed some antibody titre (about 10), as did the blood samples of the offspring. The blood sample of the sow at this time showed little antibody titre. However, the one-week milk titre had increased to 100 while the titre in the offsprings' blood was still 10 and in the sow's blood was 500.

The described test suggested that a higher antigen level was advisable so as to substantially increase the blood titre in the offspring. Accordingly, one sow was injected immediately after farrowing with two $1 \times 10^{12}$ cell doses of killed *Salmonella typhimurium*, i.e., ten times the combined dose of the previous test. The titres generally showed a 10-fold increase over the titres of the sow which had received two $1 \times 10^{11}$ cell doses. In this regard, the average blood and milk titres of the sow after 24 hours were 10 and 100, respectively, and at the end of one week, 1,000 and 1,000, respectively. The baby pigs showed a titre of 10 to 100 at 24 hours and this level was maintained in the 1 week blood samples.

One sow was injected with $10^{12}$ cells of killed *Serratia marcescens* immediately after farrowing. The antibody titres in the 24-hour blood and milk samples of the sow were about 10 and 100, respectively, and 1,000 and 100, respectively, at one week. The nursing pigs showed a blood titre of 10 at one week.

In carrying out the described tests, the subcutaneous injections were made at various sites in the udder and the milk collected from each teat was separately tested. The results clearly indicated that any site in the udder outside the teats, preferably near one or more teats, was suitable. The results also showed that higher colostral antibody titres were not necessarily associated with teats near which the injections were made.

The described series of tests clearly established the practicality of immunizing both sows and their offspring through the use of specific antigens (endogenous and non-endogenous) by means of injections, specifically subcutaneous or intramuscular injections of killed antigen directly into the udder outside of the teats, in accordance with the method of the present invention. Significant increases in sow and offspring blood antibody titres occurred as a result of the injections and the blood titre of the offspring was controlled by the amount of antigen injected into the sow.

In order to demonstrate the feasibility of administering in concentrated doses a mixture of antigens to provide immunity against a wide spectrum of antigenic disease-causing agents, and to demonstrate the presence of high-immunity levels over extended periods of time, so as to reduce or eliminate immunity gaps, the following organisms were utilized as set forth in Table I below:

*Table I*

| Organism | Total No. of Cells | Volume of Cells (ml.) |
|---|---|---|
| 1. *E. coli* | $14.4 \times 10^{11}$ | 12.0 |
| 2. *E. coli* | $11.7 \times 10^{11}$ | 6.5 |
| 3. *E. coli* | $13.5 \times 10^{11}$ | 5.0 |
| 4. *Salmonella choleraesuis* | $12.6 \times 10^{11}$ | 6.0 |
| 5. *Salmonella schottmuelleri* | $11.7 \times 10^{11}$ | 6.5 |
| 6. Salmonella (dublin serotype) | $11.7 \times 10^{11}$ | 6.5 |
| 7. *Salmonella typhimurium* | $13.5 \times 10^{11}$ | 5.0 |
| 8. *Salmonella enteridis* | $12.6 \times 10^{11}$ | 6.0 |
| 9. *Proteus vulgaris* | $14.4 \times 10^{11}$ | 12.0 |
| 10. *Staphylococcus aureus* | $3.6 \times 10^{11}$ | 3.0 |
| 11. *Pasteurella multocida (suiseptica)* | $14.4 \times 10^{11}$ | 6.0 |
| 12. *Streptococcus agalactiae* | $4.8 \times 10^{11}$ | 4.0 |
| 13. *Streptococcus pyogenes* | $4.2 \times 10^{11}$ | 2.0 |
| 14. *Erysipelothrix rhusiopathiae* | $12.6 \times 10^{11}$ | 6.0 |
| | $155.7 \times 10^{11}$ | 86.5 total |

The total volume of killed cells was divided into 8 doses, each containing $1.95 \times 10^{12}$ cells. The first 10 antigens in Table I were cultivated on agar in Roux bottles. After 48 hours' incubation, the cells were killed with 10 percent formalin, centrifuged, washed with water, diluted and frozen.

The antigens numbered 11, 12, and 13 in Table I were cultivated in liquid veal infusion broth, killed with 5 percent formaldehyde and made up, as described for the first 10 organisms. The final antigen in Table I was prepared by dehydrating commercially obtained virulent desiccated living cells and then killing the cells with formalin and washing.

The antigenic mixture made from the 14 organisms of Table I was subcutaneously injected directly into the udders outside the teats of six sows according to the regimen specified in Table II below:

*Table II*

| Sow No. | Doses | Injected | Offspring (Number) |
|---|---|---|---|
| 1 | 2 | 2 days before farrowing | 12 |
| 2 | 2 | 1 day before farrowing | 13 |
| 4 | Control | None | 10 |
| 5 | 1 1 | 4 hrs. after farrowing | 12 |
| 3 | 1 1 | do | 9 |
| 6 | 2 | 2 hrs. after farrowing | 11 |

[1] ½ dose administered to each side of udder.

Sows Nos. 1, 2, and 6 were given two doses each of the antigenic mixture.

Antibody blood titres against scours (antigens 1–13) antigen in the injected sows generally increased to 10–1000 within 48 hours after the intramammary injections, whether such injections were given before or after farrowing. Sow blood and milk titres increased to, in several cases, 10,000 by the seventh day after farrowing.

Blood titres of the offspring of the injected sows increased from a negligible quantity at birth to 10–100 at 24 hours after birth and about 100 at 7, 14 and 42 days after birth. The antibody titres with respect to erysipelas antigen were similar for both sows and offspring, except that by 42 days after birth the average blood titre of the offspring was about 10, having somewhat declined from 100 at 7 and 14 days after birth.

The described series of tests clearly demonstrated that a mixture of antigens given by intramammary injection into the sows in accordance with the present invention rapidly conferred immunity on both the sow and the offspring, and that this immunity was long lasting, extending for at least the duration of the tests, 6 weeks after birth, and probably long thereafter. Accordingly, reductions in or elimination of the usual immunity gaps of the young pigs for antigenic disease-causing agents were obtained.

The method of the present invention can be effectively applied using antigens of a wide variety of swine disease-causing agents, examples of which are set forth in Table III below:

*Table III*

| Killed Disease-Causing Agents | Swine Diseases |
| --- | --- |
| Various species of: | |
| Escherichia | Bacterial scours. |
| Salmonella | Intestinal infections. |
| Pasteurella | Diarrhea. |
| Streptococcus | Enteritis. |
| Staphylococcus | Colibacillosis. |
| Diplococcus | Coliform infections. |
| Proteus | |
| Klebsiella | Respiratory infections or other generalized infections. |
| Shigella | |
| *Erysipelothrix rhusiopathiae* | Erysipelas. |
| *Brucella suis* | Swine brucellosis. |
| Hog Cholera Virus | Hog Cholera. |
| Actinomycetes | Actinomycosis. |
| Killed cellular tissue extracts from animals having swine dysentery or T.G.E. | Swine dysentery or transmissible gastroenteritis. |

Various manufacturing procedures can be employed for the preparation of suitable antigens for use in the method of the present invention. Representative methods of manufacture of the antigens are set forth in Table IV below:

*Table IV*

| Antigens | Method of Manufacture |
| --- | --- |
| Bacteria, Yeasts Molds, and Actinomycetes. | Cultivated in fermentation tanks in media appropriate to each, killed by addition of chemical disinfectants, harvested by any conventional harvesting method for micro-organisms such as centrifugation, and resuspended in distilled water to desired density, with preservatives such as antibiotics, sodium benzoate, or the like. |
| Viruses | Grown in pigs, rabbits, or other animals, or in tissue culture, or by other means, killed chemically and prepared as liquid vaccine to which are added preservatives. |
| Tissue of animals having suffered from diseases for which the causative agents have not been isolated or cultivated. | Macerating tissue of animals who have died or become sick from said disease, taking precautions in handling to avoid contamination, killing all living organisms present with chemicals, squeezing body fluids and juices out of said macerates, filtering to obtain a clear liquid containing the killed causative agents of disease in liquid extracts, and adding preservatives. |

The method of the present invention has been found to be effective, convenient and practical for conferring immunity on nursing pigs against one or a plurality of antigenic disease-causing agents. Immunity is also conferred on the sow in practicing the method. The immunity gap in young pigs from shortly after birth until many weeks thereafter can be maintained at a level substantially above that provided naturally. Accordingly, mortality, unthriftiness and scours in young pigs due to antigenic diseases can be substantially reduced, with consequent savings to the swine breeder. Other advantages of the present invention are as set forth in the foregoing.

Various of the features of the present invention are set forth in the appended claims.

What is claimed is:

1. A method of protecting the offspring of swine during and after nursing against microbial diseases, which method comprises injecting directly in the mammary tissue of a sow, during the period commencing about four days before the birth of offspring from said sow and terminating about 24 hours after said birth, antigen originating from organisms causing the disease to be protected against.

2. A method of protecting the offspring of swine during and after nursing against microbial diseases, which method comprises injecting directly into the mammary tissue of a sow, during the period commencing about four days before the birth of offspring from said sow and terminating about 24 hours after said birth, killed antigen originating from organisms causing the disease to be protected against, in an amount sufficient to confer immunity on said offspring.

3. A method of protecting the offspring of swine during and after nursing against microbial diseases, which method comprises injecting directly into the mammary tissue of a sow, exclusive of the teats, during the period commencing about 4 days before the birth of offspring from said sow and terminating about 24 hours after said birth, killed antigen originating from organisms causing the disease to be protected against.

4. A method of protecting the offspring of swine during and after nursing against microbial diseases, which method comprises injecting directly into the mammary tissue of a sow in the region surrounding the teats during the period commencing about 4 days before the birth of offspring from said sow and terminating about 24 hours after said birth, killed antigen originating from organisms causing the disease to be protected against, in an amount sufficient to increase the blood antibody titre of said offspring.

5. A method of protecting the offspring of swine during and after nursing against microbial diseases, which method comprises injecting directly into the udder of a sow in the region surrounding the teats, during the period commencing about 4 days before the birth of offspring from said sow and terminating about 24 hours after said birth, killed antigen originating from organisms causing the disease to be protected against, said antigen being present in an amount sufficient to establish in said offspring through said sow's colostrum antibody titres against said antigen sufficiently high to afford effective protection of said offspring from said disease during a period of life in said offspring corresponding to at least a portion of the usual immunity gap for said disease.

6. A method of protecting the offspring of swine during and after nursing against microbial diseases, which method comprises injecting by needle directly into the mammary tissue of a sow, exclusive of the teats, during the period commencing from birth of offspring from said sow and terminating about 24 hours after said birth, killed antigen originating from organisms causing the disease to be protected against, said antigen being present in an amount sufficient to establish in said offspring through said sow's colostrum antibody titres against said antigen sufficiently high to afford effective protection of said offspring from said disease, for a period of life in said offspring corresponding to the usual immunity gap for said disease.

7. A method of protecting the offspring of swine during and after nursing against microbial diseases, which method comprises injecting directly into the mammary tissue of a sow, exclusive of the teats, during the period commencing from birth of said offspring from said sow and terminating about 24 hours after said birth, killed antigen originating from organisms causing the disease to be protected against, said antigen being present in an amount sufficient to increase in said offspring, through said sow's colostrum, antibody titres against said antigen.

8. A method of protecting the offspring of swine during and after nursing against microbial diseases, which method comprises injecting directly into the mammary tissue of a sow, exclusive of the teats, during the period commencing from birth of said offspring from said sow and terminating about 24 hours after said birth, fluid containing a concentration of killed antigen, originating from organisms causing the disease to be protected against, sufficient to establish in said offspring, through said sow's colostrum, antibody titres against said antigen sufficiently high to afford effective protection of said offspring from said disease for a period of life in said offspring corresponding to the usual immunity gap for said disease.

References Cited in the file of this patent

FOREIGN PATENTS 837,695    Great Britain _____ June 15, 1960

OTHER REFERENCES

"Mother Protects Baby," Science News Letter for March 31, 1956, page 197.

Petersen et al.: "Use of Protective Principles in Milk and Colostrum in Prevention of Disease in Man and Animals," Quarterly Review of Allergy and Allied Immunology, vol. 10, No. 2, pages 185–186, June 1956.

Campbell et al.: "Diathetic Immunization—A Maternal-Offspring Reliationship Involving Milk Antibodies," Science, vol. 125, No. 3254, pp. 932–933, May 10, 1957.

Lemcke et al.: "Antibody Content of Colostrum and Piglet Serum Following Vaccination of the Sow," J. Comp. Path. Ther. 71, pp. 268–278, July 1961.